United States Patent
Yuhas

(10) Patent No.: US 7,934,777 B1
(45) Date of Patent: May 3, 2011

(54) OUTBOARD HUB BARREL MOUNTED ROTOR

(75) Inventor: David Michael Yuhas, Granger, IN (US)

(73) Assignee: Robert Bosch GmbH, Stuttgart (DE)

( * ) Notice: Subject to any disclaimer, the term of this patent is extended or adjusted under 35 U.S.C. 154(b) by 176 days.

(21) Appl. No.: 12/037,132

(22) Filed: Feb. 26, 2008

(51) Int. Cl.
*F16D 65/12* (2006.01)

(52) U.S. Cl. .................... 301/6.8; 301/105.1; 188/18 A; 188/218 XL

(58) Field of Classification Search .................... 301/6.1, 301/6.6, 6.7, 6.8, 105.1; 188/18 A, 218 XL
See application file for complete search history.

(56) References Cited

U.S. PATENT DOCUMENTS

| | | | | |
|---|---|---|---|---|
| 2,781,231 | A * | 2/1957 | Black | 301/105.1 |
| 5,921,633 | A * | 7/1999 | Neibling et al. | 301/6.1 |
| 5,988,761 | A | 11/1999 | Visser et al. | |
| 6,076,896 | A * | 6/2000 | Bertetti et al. | 301/105.1 |
| 6,145,632 | A * | 11/2000 | Rutter | 188/18 R |
| 6,230,555 | B1 | 5/2001 | Doerrie et al. | |
| 6,247,562 | B1 * | 6/2001 | Gotti et al. | 188/218 XL |
| 6,722,479 | B2 * | 4/2004 | Baumgartner et al. | 188/218 XL |
| 6,802,399 | B2 * | 10/2004 | Niebling et al. | 188/18 A |
| 6,910,556 | B1 * | 6/2005 | Baumgartner et al. | 188/218 XL |
| 6,978,866 | B2 * | 12/2005 | Niebling et al. | 188/18 A |
| 6,988,598 | B2 | 1/2006 | Williams | |
| 7,028,816 | B2 * | 4/2006 | Baumgartner et al. | 188/218 XL |
| 7,281,769 | B2 * | 10/2007 | Pete et al. | 301/105.1 |
| 7,374,024 | B2 * | 5/2008 | Iraschko | 188/18 A |
| 7,410,036 | B2 * | 8/2008 | Wimmer et al. | 188/218 XL |
| 7,610,999 | B2 * | 11/2009 | Sadanowicz et al. | 188/218 XL |
| 2005/0236886 | A1 * | 10/2005 | Hall et al. | 301/105.1 |

FOREIGN PATENT DOCUMENTS

| | | |
|---|---|---|
| DE | 4338593 | 5/1995 |
| DE | 10323310 | 12/2004 |
| EP | 1681488 | 7/2006 |
| EP | 1759881 | 3/2007 |

* cited by examiner

*Primary Examiner* — Russell D Stormer
(74) *Attorney, Agent, or Firm* — Maginot, Moore & Beck

(57) ABSTRACT

A vehicle wheel assembly includes a vehicle wheel, a disc brake rotor, and a rotatable hub in which the rotor is securely clamped to the hub independently of the clamping of the wheel to the hub providing a desirable rigid coupling of the rotor and wheel without any physical contact between the wheel and rotor. The hub functions as an intermediate member for supporting both the rotor and the wheel while precluding direct contact therebetween to reduce any rotor deformation which might be induced by the more conventional technique of clamping of the rotor between the wheel and the hub.

11 Claims, 6 Drawing Sheets

OUTBOARD HUB BARREL MOUNTED ROTOR

BACKGROUND OF THE INVENTION

1. Field of the Invention

The present invention relates to disc braking systems and more particularly to a distortion reducing technique for affixing a disc brake rotor to a rotatable wheel hub.

2. Description of the Related Art

Many motor vehicles include disc brake systems having a circular metal disc brake rotor with opposed braking surfaces that are clamped by brake pads carried by a brake caliper to exert a braking effect. The wheel hub incorporates an anti-friction wheel bearing assembly in which one race of the bearing is coupled to the vehicle suspension and the other rotationally mounts the brake rotor and wheel. Ordinarily the rotating components of the rotor, wheel and hub assembly are manufactured separately and assembled together by a plurality of bolts and lug nuts which clamp the wheel to the hub flange with a so-called hat or mounting flange portion of the rotor clamped therebetween. In order to enhance performance of the braking system it is desired to carefully and accurately control the dimensional characteristics of the rotor braking surfaces as the rotor rotates. The thickness variation of the disc and the lateral run-out or lateral deflection of the surfaces as they rotate needs to be held to minimum tolerances. The desire to control lateral run-out of braking surfaces of a disc rotor are well known and rotor manufacturing techniques have been improved to reduce such run-out.

For example, U.S. Pat. No. 5,988,761 teaches a wheel end hub assembly for a motor vehicle incorporating mechanical retention features which accurately and positively orient the motor vehicle brake component, such as a disc brake rotor or brake drum with respect to its wheel hub. With this approach, the machining operations for the brake component braking surfaces can be accurately based from a datum surface of the hub. The assembly incorporates a retention nut threaded onto the wheel mounting bolts which exerts a clamping force on the brake component, e.g., a rotor mounting flange, and further establishes the relative positions of the hub and brake component. In this patented arrangement, the wheel is fixed to the hub with lug nuts engaging the mounting bolts and clamping the wheel against the braking component.

U.S. Pat. No. 6,988,598 points out that in conventional disc brake systems, the rotor is generally rigidly attached to the wheel or hub. With this type of attachment method, the rotor run-out must be generally controlled within approximately 0.003 inches to 0.005 inches. Some racing vehicles, such as used in some classes of drag racing, utilize specialized racing aluminum wheels and the rotor must be mounted directly to such wheels. However, these wheels often do not have a mounting surface that runs true enough to mount the rotor within the permissible range of run-out without additional machining. This additional machining requires additional work time and expense and can reduce the strength of the wheel. To solve this problem, the patented device allows the rotor to slide axially during brake application assuming a new axial location not dictated by the wheel face after release of the braking pressure. This patent suggests a disc brake rotor mounting system that enables self-alignment of the rotor without the need for a precision mounting surface on the wheel. In a preferred embodiment, a generally circular wheel adapter is adapted for mounting to a surface of a hub or wheel with fasteners engaging the hub or wheel through a plurality of wheel attachment bores spaced around a circumference of the wheel adapter. The wheel adapter includes a plurality of drive pin bores spaced around its circumference through which drive pin attachment bolts can be inserted to threadingly engage a like plurality of drive pins. The drive pin attachment bolts securely fasten the drive pins to the wheel adapter. The brake rotor includes a plurality of radially aligned drive slots positioned to align with the plurality of drive pins. Alignment bushings mount between each of the rotor drive slots and a corresponding drive pin. The alignment bushings include a central channel and a pair of flanges. The raised flanges slidingly engage opposing sides of the brake rotor and axially retain each alignment bushing with respect to its corresponding drive slot.

In operation during braking, calipers press on the brake rotor causing torque on the brake rotor resistant to the rotation of the wheel to which the brake rotor is attached. This torque is transmitted as force through the alignment bushings to the drive pins and so on to the wheel itself. As the calipers grip on the brake rotor, any misalignment of the brake rotor will result in the calipers exerting greater force on one or the other side of the brake rotor. In such a case, once the net force on the brake rotor overcomes the resistance of the drag rings, the brake rotor will slide in or out on the drive pins until located such that the calipers exert the same force on both sides of the brake rotor. Once the braking operation subsides and the calipers no longer exert any force on the brake rotor, the brake rotor stays fixed in its new location and orientation due to the drag rings. Neither of these patented arrangements recognizes that rotor brake plate run-out can increase on the vehicle due to mounting flange distortions that occur when the wheel contacts the rotor flange as it attaches to the hub, let alone suggesting any solution to such a problem.

It is desirable to minimize mounting induced rotor lateral run-out along with other sources of lateral run-out.

SUMMARY OF THE INVENTION

The present invention provides solutions to these problems by fixing the rotor to the hub flange outside the wheel-to-hub flange bolted joint to reduce mounted rotor distortion induced by wheel clamp load.

The invention comprises, in one form thereof, a vehicle wheel assembly including a conventional vehicle wheel with a plurality of generally equiangularly spaced mounting bolt receiving apertures, a disc brake rotor having a mounting flange, and a journaled wheel hub having a generally planar wheel contact area for receiving the wheel. There is a generally planar rotor flange contact area for receiving the rotor mounting flange. The rotor flange contact area extends generally parallel to and axially spaced from the wheel contact area. The wheel contact area has a plurality of generally equiangularly spaced radially extending axially raised lobes, one for each wheel mounting bolt aperture, for receiving a corresponding wheel mounting bolt and the rotor flange contact area comprises a like plurality of recesses interleaved with the lobes for receiving generally equiangularly spaced radially inwardly extending rotor fingers each shaped to fit within a corresponding recess.

An advantage of the present invention is that the rotor is securely clamped to the hub independently of the clamping of the wheel to the hub providing a desirable rigid coupling of rotor to wheel without any direct physical contact between the wheel and rotor.

A further advantage of this invention resides in the barrel mounting of the rotor and as a result, any hub deflections occurring in this area are minimized and would not be translated into rotor brake plate lateral run out. Further, since the rotor is outboard mounted, it can be serviced or replaced without removing the hub.

BRIEF DESCRIPTION OF THE DRAWINGS

Corresponding reference characters indicate corresponding parts throughout the several drawing views.

DETAILED DESCRIPTION OF THE INVENTION

Figure 1:
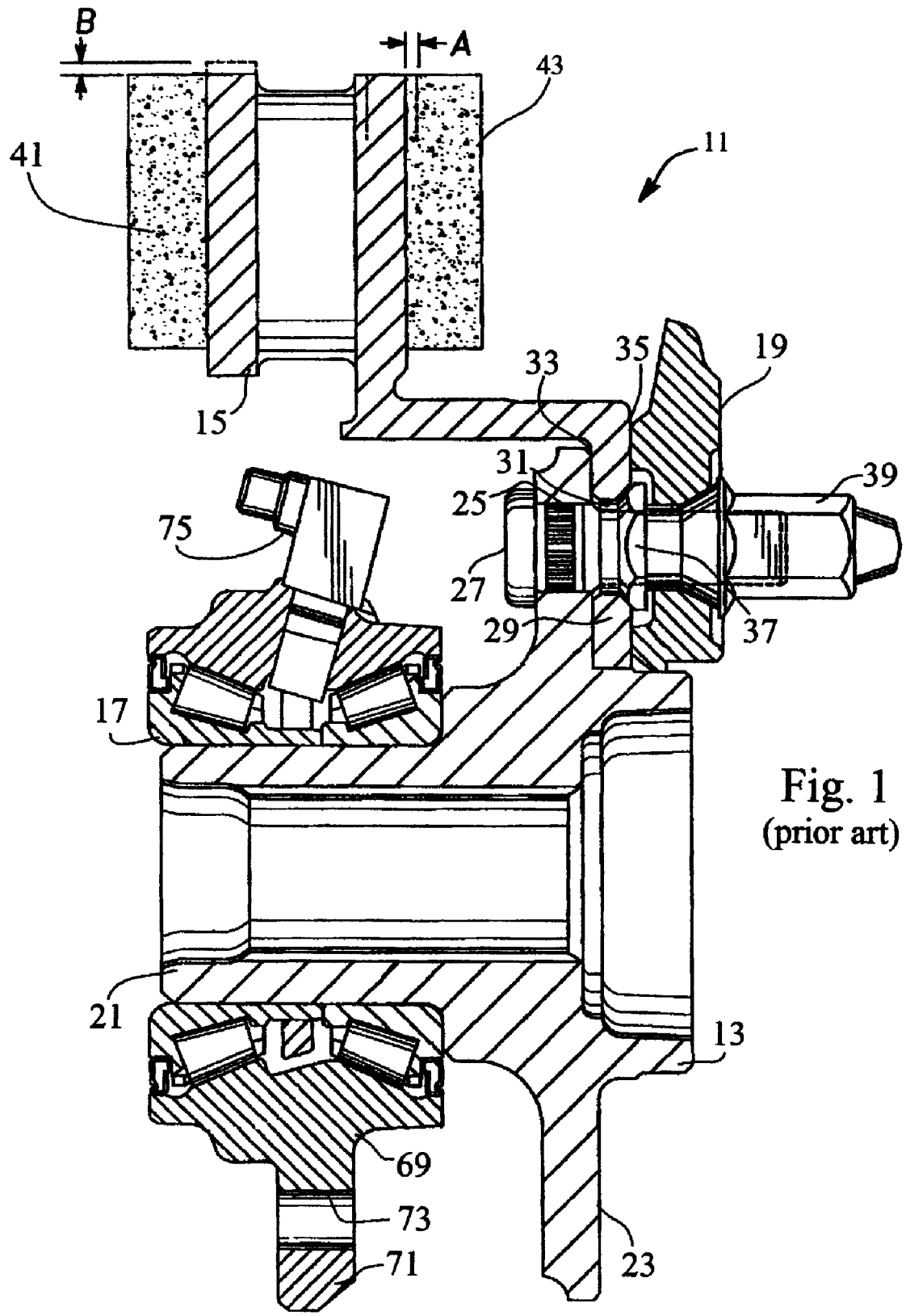
FIG. 1 is a cross-sectional view of a portion of a wheel mounting assembly accordingly to the prior art.

Referring now to the drawings and particularly to FIG. 1, there is shown a cross-sectional view through a wheel mounting assembly 11 according to U.S. Pat. No. 5,988,761. The assembly includes hub 13, brake rotor 15, a cartridge type wheel bearing assembly 17 mounted to hub 13, and wheel 19 mounted against rotor 15. The outer race 69 of bearing assembly 17 is a unitary assembly, that forms the outer race surfaces for the sets of tapered roller bearings and includes flange 71 and bore 73 enabling it to be mounted to a suspension component of the vehicle. The wheel bearing assembly 17 may also include a toothed tone wheel which provides a signal for wheel speed sensor 75 related to wheel speed. These components are used as part of a vehicle anti-lock brake system or traction control system. Rotor 15 is spanned by caliper supported braking pads 41 and 43. Hub 13 includes a generally cylindrical barrel section 21 and a radial protruding rotor annular mounting flange 23. Flange 23 forms a number of wheel mounting bolt bores 25 which receive wheel mounting bolts 27. Brake rotor 15 includes a generally circular mounting flange 29 including a plurality of bolt clearance holes 31 which are in registry with wheel mounting bolt bores 25. Rotor mounting flange 29 defines an inboard surface 33 and an opposed outboard surface 35. Mounting flange 29 surface 33 is clamped against the outboard surface of the mounting flange 23 of the hub 13 by nuts such as 37. Wheel 19 is clamped against the outboard surface 35 of rotor flange 29 by nuts such as 39. Tightening nuts 39 to secure the wheel 19 to hub 13 with the rotor flange 29 captive therebetween may induce deformation in rotor flange 29 causing undesired lateral rotor run-out as illustrated by dimension A. The clamping may also induce some radial run-out as indicated by dimension B in FIG. 1, however, the present invention is primarily concerned with lateral run-out.

Figure 2:
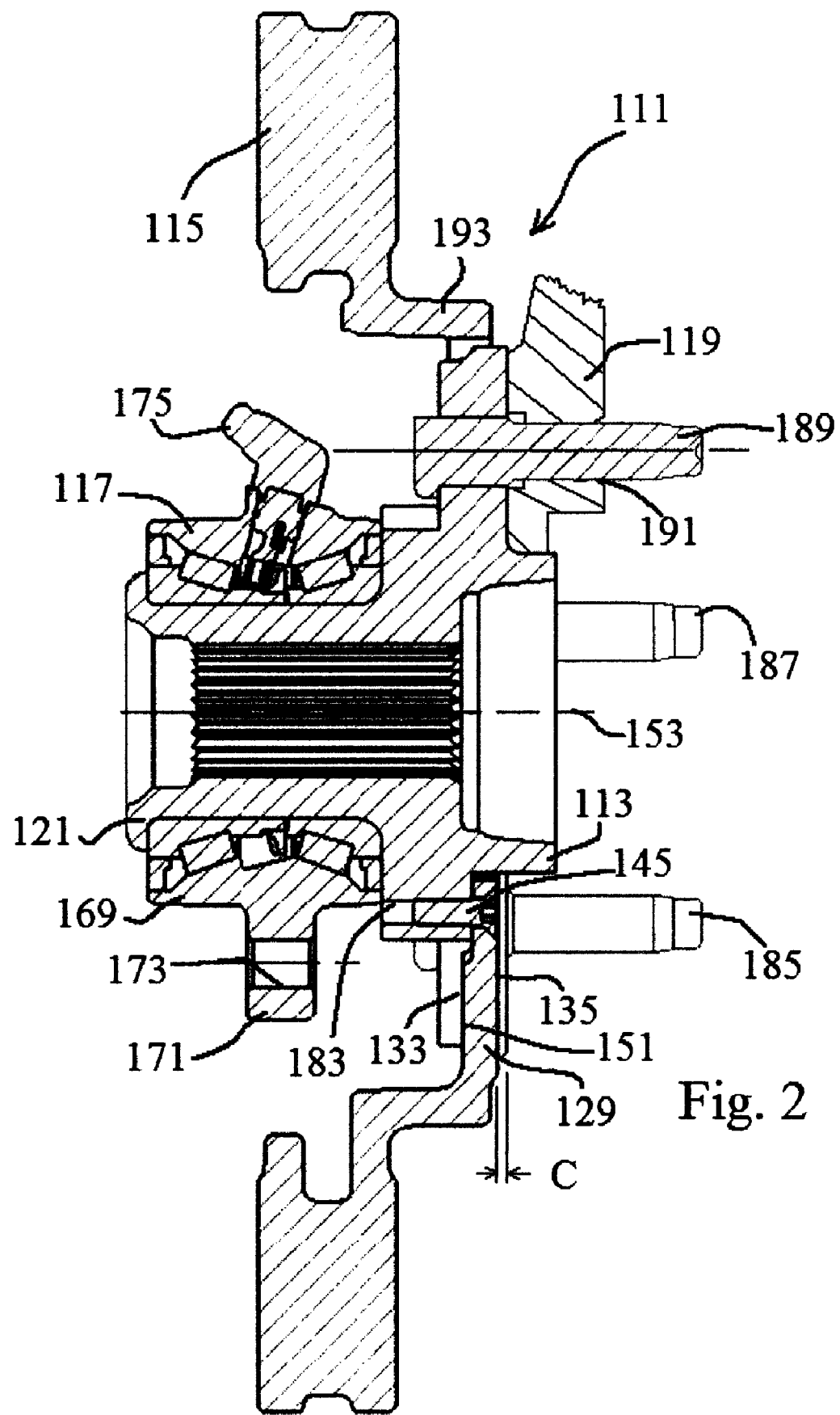
FIG. 2 is a cross-sectional view of a portion of a wheel mounting assembly accordingly to the present invention.
Figure 3:
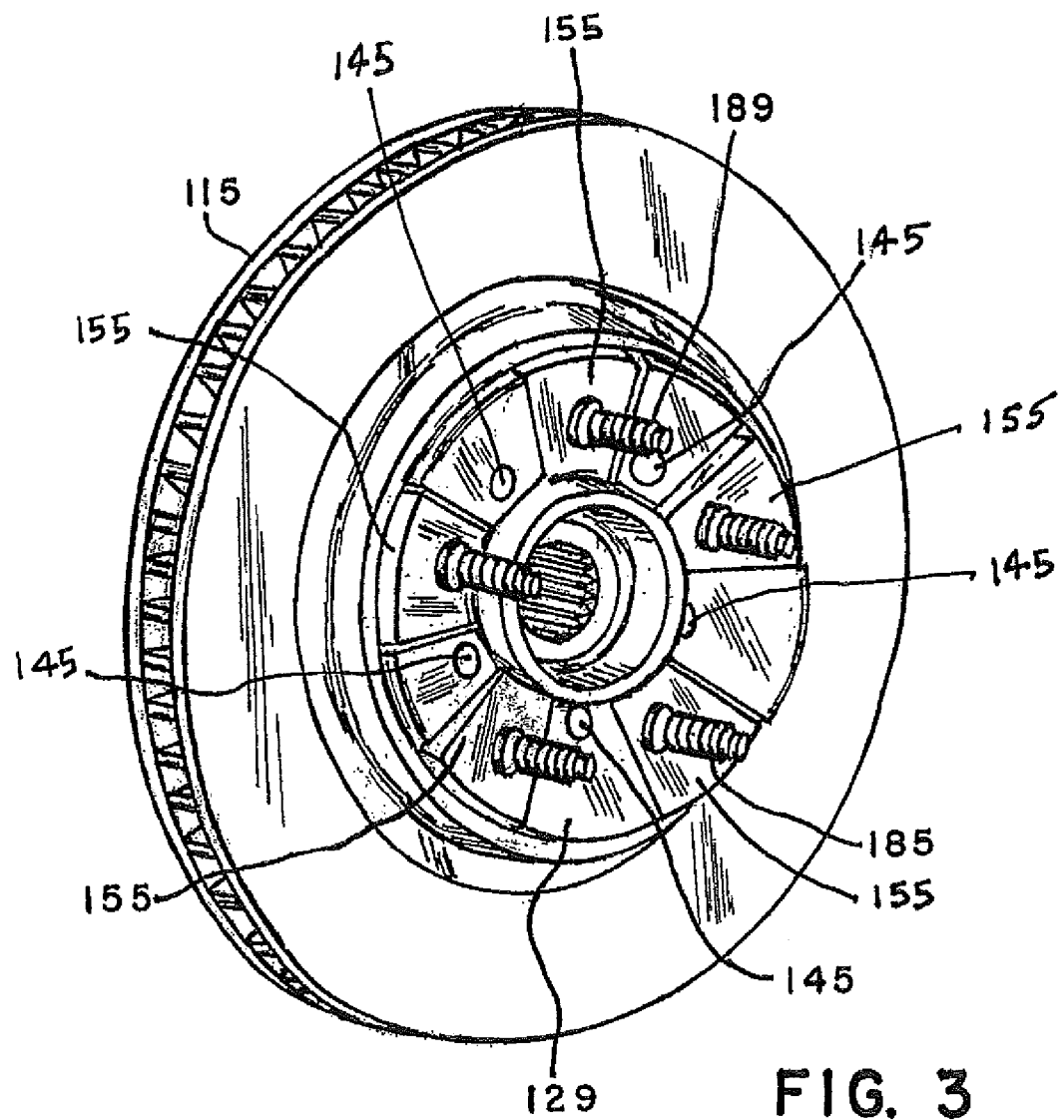
FIG. 3 is an isometric view of the assembly of FIG. 2 with the wheel removed.
Figure 4:
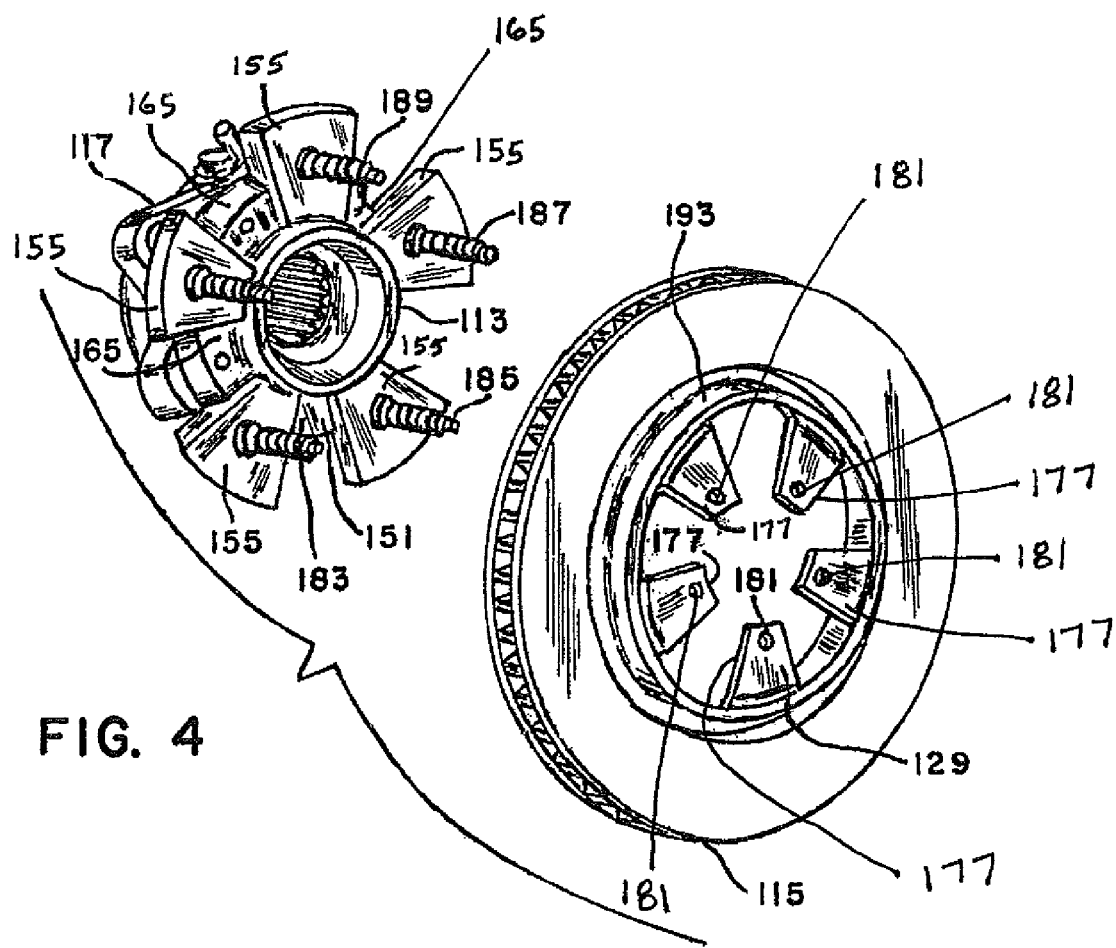
FIG. 4 is an exploded isometric view of the assembly of FIG. 3.

In FIGS. 2-4 analogous parts bear reference numerals one hundred greater than corresponding reference numerals of FIG. 1. The joined hub 113, brake rotor 115 and wheel 119 rotate together about a common axis 153. Rotor 115 has a mounting flange 129 with inboard 133 and outboard 135 surfaces. Inboard surface 133 is clamped against the flange of hub 113 by threaded fasteners 145 of FIG. 3 which pass through corresponding rotor flange holes 181 (FIG. 4) and threadedly engage hub apertures 183. The hub surface 151 (best seen in FIG. 4) to which the rotor face 133 is clamped is, however, quite different from the outboard surface of flange 23. The wheel hub 113 has a generally planar wheel mounting face or contact area comprising the plurality of generally equiangularly spaced radially extending axially raised lobes 155 for receiving the wheel 119 inboard surface. The separated wheel mounting flanges allow localized wheel clamp load distortion significantly reducing the impact on the rotor. The generally planar rotor flange contact area 151 comprises the intervening recesses such as 165 and 167 for receiving the rotor mounting flange 129. FIG. 4 shows the rotor mounting flange 129 as a plurality (here five) of generally equiangularly spaced radially inwardly extending fingers 177 each shaped to fit within a corresponding recess between adjacent lobes. The rotor flange contact area 151 extends generally parallel to the wheel contact area and is axially spaced therefrom a distance C as shown in FIG. 2. In order for this clearance distance to exist, the maximum axial dimension of the fingers 177 within the corresponding recesses 165 should be less than the axial space between the wheel contact area 155 and the rotor flange contact area 151. A typical number of wheel mounting lugs for passenger vehicles is four or five while somewhat larger pickup trucks or vans may employ eight or more. Five wheel mounting bolts 185, one for each wheel mounting bolt aperture such as 191 are illustrated. Like numbers of lobes 155, recesses 165, fingers 177, and rotor mounting bolts 145 are shown.

Figure 5:
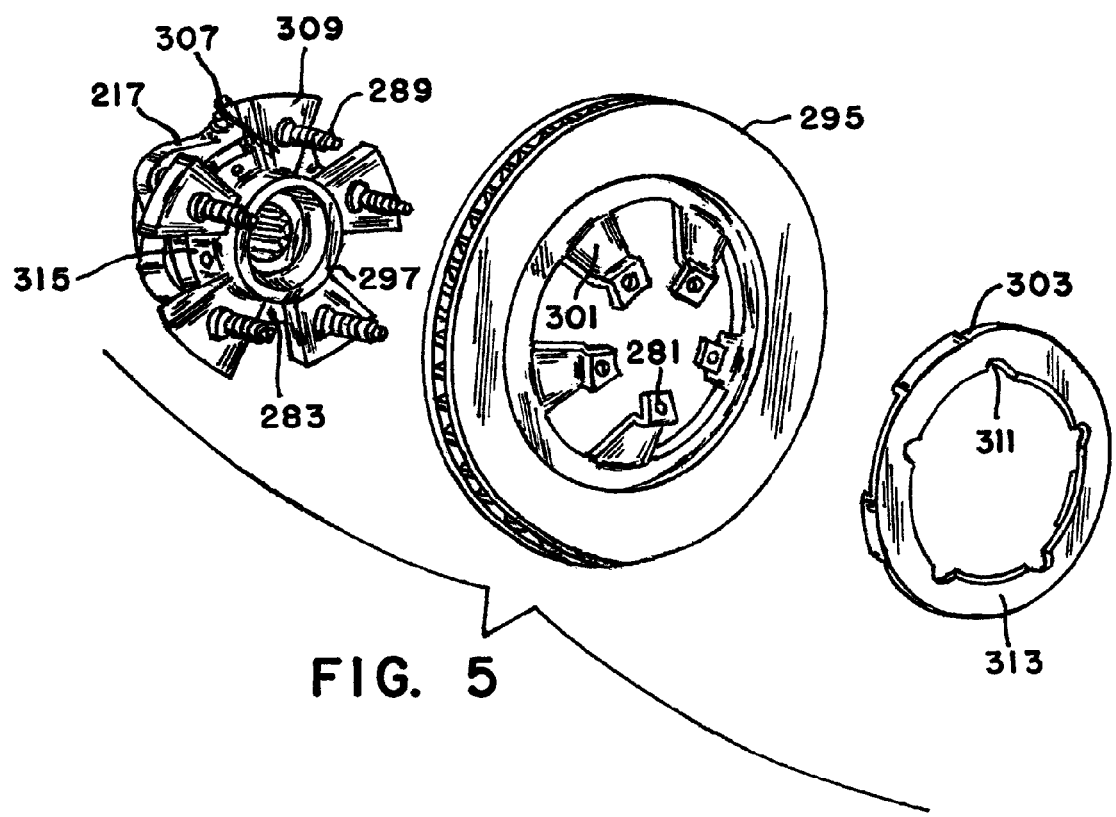
FIG. 5 is an exploded isometric view similar to FIG. 4, but illustrating a modified form of the present invention.
Figure 6:
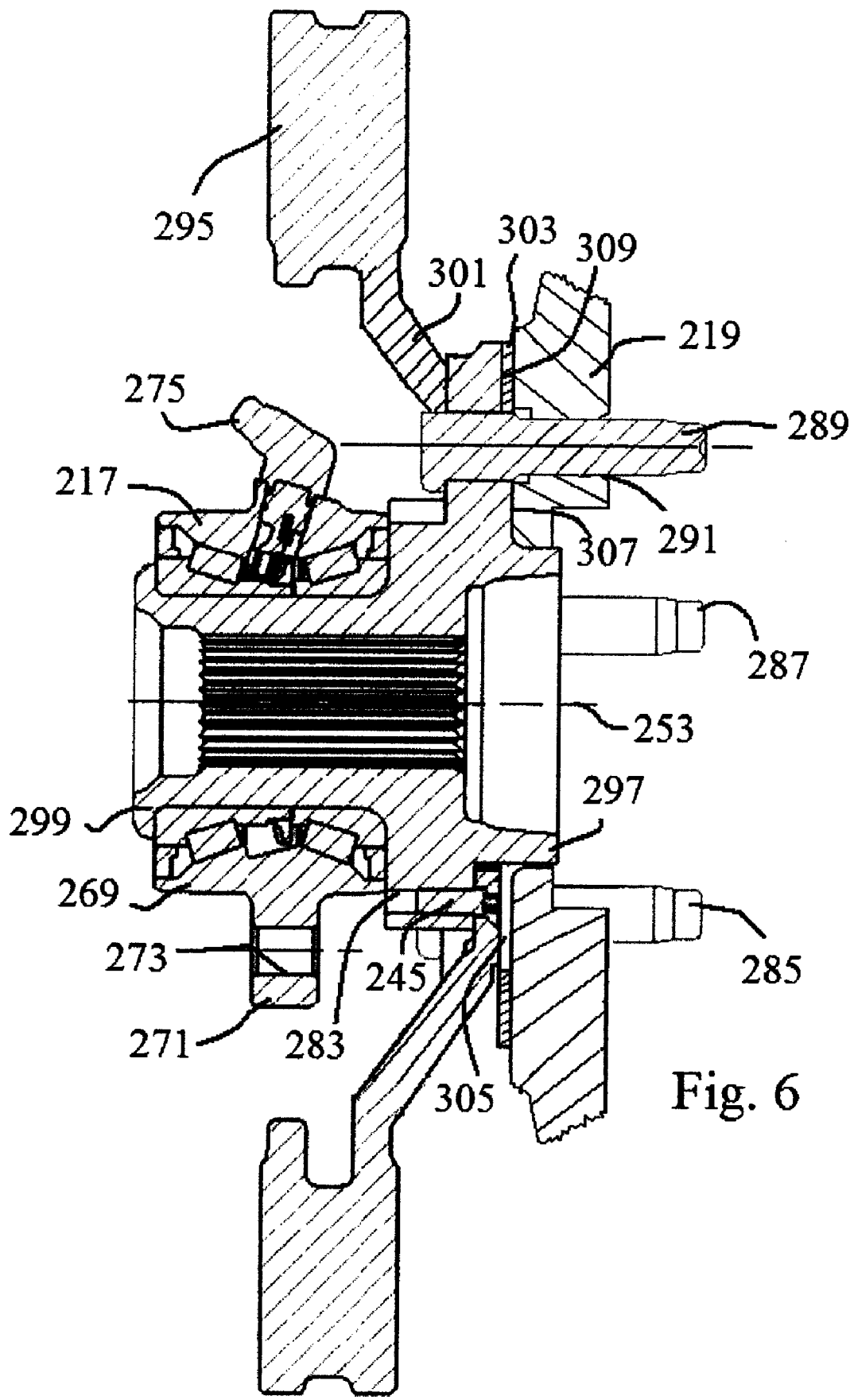
FIG. 6 is a cross-sectional view of a portion of the wheel mounting assembly of FIG. 5.

FIGS. 5 and 6 illustrate one of many possible alternate embodiments of the present invention. This embodiment may be employed when a full three hundred sixty degree support of the wheel is desired. As before, components analogous to those discussed earlier bear reference numerals one hundred greater than those previously used. Thus, a vehicle wheel 219 has mounting bolts such as 289 passing through wheel mounting bolt aperture such as 291 for fixing the wheel to a brake rotor, and journaled hub 297 with the assembly rotatable about a common axis 253. The hub 297 again has barrel 299 and flange portions which rigidly couple the wheel and rotor for co-rotation about a that common axis and functions as an intermediate member for supporting both the rotor and the wheel while precluding direct contact therebetween. The most striking dissimilarities between FIGS. 4 and 5 are the presence in FIG. 5 of an extra annular ring 303 and a quite different shape of the rotor hat portions 193 and 301. In FIGS. 5 and 6, the hat portion is now frustoconical tapering inwardly toward the attachment flange and its rotor flange holes such as 281, and the surface to which the wheel 219 clamps is now composed of two separable members, the outboard surface 313 of ring 303 and the hub surfaces formed by axially raised lobes. Closer inspection reveals these lobes have two axially spaced plane surfaces or faces 307 and 309 for receiving the wheel and rotor respectively. The ring 303 rests on surface 309 while the wheel 219 engages ring surface 313 and surface 307. Semicircular notches 311 receive the outer halves of the mounting bolts 289. Hub face 307 is axially outboard of the second face 309 relative to the vehicle. As in the earlier embodiment, the first face 307 comprises a plurality of generally equiangularly spaced radially extending petals and the rotor includes a like plurality of generally equiangularly spaced radially inwardly extending tabs interleaved between the petals, however, only a portion of the rotor tabs lies between adjacent petals since part of each tab forms the frustoconical portion which provides the clearance for the mounting ring 303. However, the axial extent of the petals still exceeds the thickness of the intervening rotor tabs. The ring 303 pilots onto the recess formed by the flange or petal portions 309 and lies between the hub petals or fingers 307 so there is still a gap or separation 305 between the rotor flange and the wheel 219 similar to distance or space C in FIG. 2. As before, a first plurality of wheel mounting bolt 289 and lug fasteners couple the wheel to the hub 297 and second plurality of fasteners 283 rigidly couple the hub and rotor.

Thus, while a preferred embodiment has been disclosed, numerous modifications will occur to those of ordinary skill in this art. Accordingly, the scope of the present invention is to be measured by the scope of the claims which follow.

What is claimed is:

1. A vehicle wheel assembly, comprising:
   a wheel hub configured to rotate about an axis, said wheel hub including (i) a plurality of wheel contact structures respectively defining a plurality of wheel contact surfaces, and (ii) a plurality of rotor flange contact surfaces interleaved between said plurality of wheel contact structures, said plurality of wheel contact structures and said plurality of rotor flange contact surfaces defining a plurality of rotor flange mounting recesses that are interleaved with said plurality of wheel contact surfaces of said plurality of wheel contact structures;
   a disc brake rotor including (i) a first rotor portion configured to be clamped between a pair of brake pads, and (ii) a second rotor portion mounted to said wheel hub, said second rotor portion including a plurality of rotor flange extensions respectively received within said plurality of rotor flange mounting recesses and respectively positioned in contact with said plurality of rotor flange contact surfaces; and
   a vehicle wheel having an inboard mounting surface positioned in contact with said plurality of wheel contact surfaces,
   wherein each of said plurality of rotor flange extensions is interposed between a respective one of said plurality of rotor flange contact surfaces and said vehicle wheel.

2. The vehicle wheel assembly of claim 1, wherein:
   each of said plurality of wheel contact surfaces defines a wheel mounting face that faces toward said vehicle wheel, and
   each of said plurality of rotor flange contact surfaces defines a rotor mounting face that faces toward said vehicle wheel.

3. The vehicle wheel assembly of claim 1, wherein (i) said wheel hub defines a plurality of hub apertures respectively aligned with said plurality of rotor flange contact surfaces, and (ii) said plurality of rotor flange extensions respectively defines a plurality of rotor flange holes, further comprising:
   a plurality of fasteners respectively extending (i) through said plurality of rotor flange holes, and (ii) into said plurality of hub apertures.

4. The vehicle wheel assembly of claim 3, further comprising a plurality of wheel mounting bolts respectively supported by said plurality of wheel contact structures of said wheel hub,
   wherein said vehicle wheel defines a plurality of mounting bolt receiving apertures which respectively receive said plurality of wheel mounting bolts therethrough.

5. The vehicle wheel assembly of claim 1, wherein
   said wheel hub defines a plurality of hub apertures (i) respectively aligned with said plurality of rotor flange contact surfaces, and (ii) facing toward said vehicle wheel, and
   said plurality of rotor flange extensions respectively defines a plurality of rotor flange holes configured to align with said plurality of hub apertures.

6. The vehicle wheel assembly of claim 1, wherein each of said plurality of rotor flange extensions are spaced apart from said vehicle wheel so as to define a gap therebetween.

7. The vehicle wheel assembly of claim 1, wherein each of said plurality of rotor flange extensions extends inwardly toward said axis.

8. The vehicle wheel assembly of claim 1, wherein:
   each of said plurality of rotor flange extensions defines a finger that extends inwardly toward said axis, and
   said finger has a rotor flange hole defined therein that is configured to receive a fastener therethrough.

9. The vehicle wheel assembly of claim 1, wherein:
   said plurality of wheel contact surfaces are equally spaced apart from each other, and
   said plurality of rotor flange extensions are equally spaced apart from each other.

10. The vehicle wheel assembly of claim 1, further comprising a plurality of wheel mounting bolts respectively supported by said plurality of wheel contact structures of said wheel hub.

11. The vehicle wheel assembly of claim 10, wherein said vehicle wheel defines a plurality of mounting bolt receiving apertures which respectively receive said plurality of wheel mounting bolts therethrough.

\* \* \* \* \*